Patented June 25, 1940

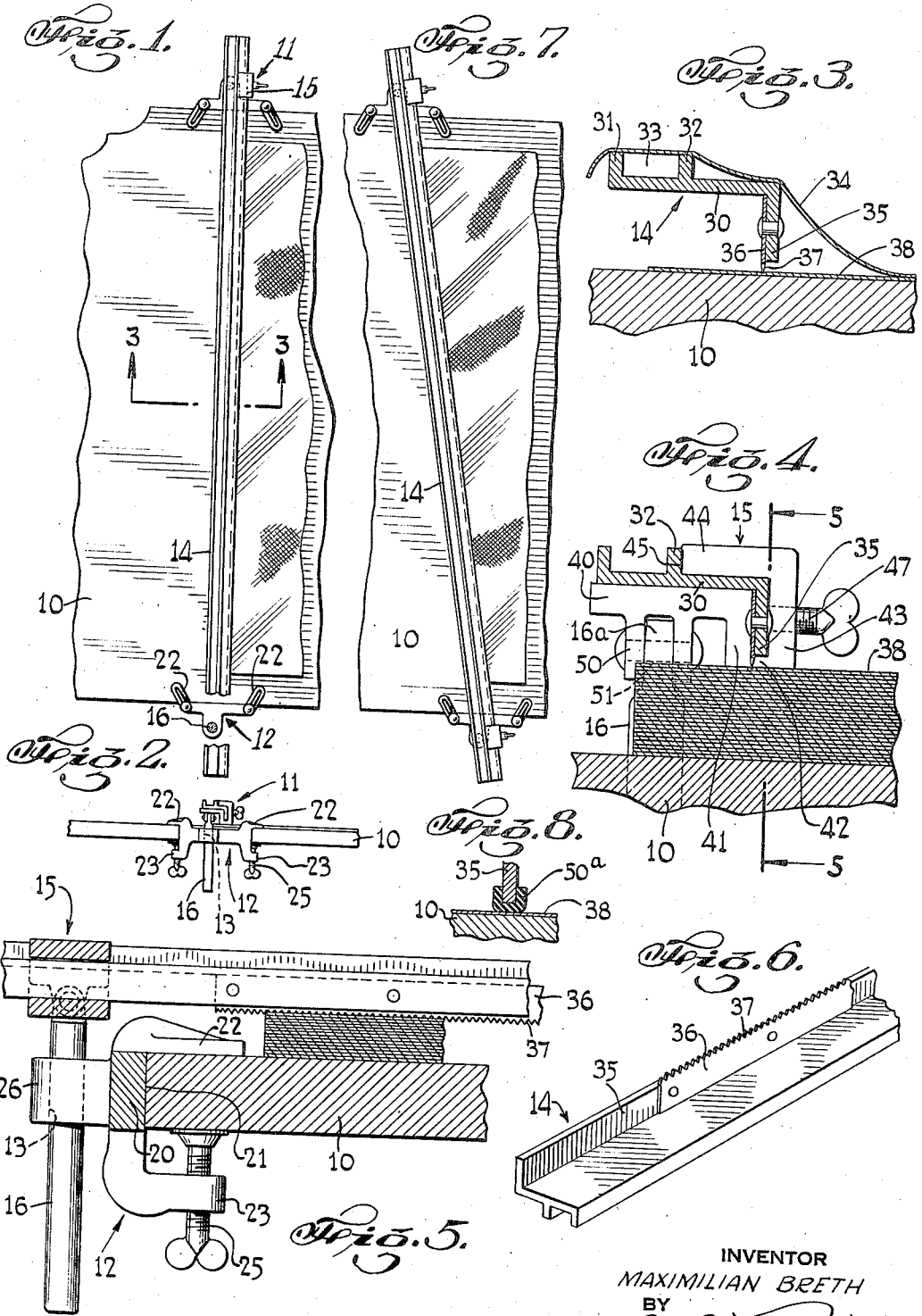

2,205,743

UNITED STATES PATENT OFFICE 2,205,743

SHEAR GUIDE FOR CUTTING CLOTH

Maximilian Breth, Ozone Park, N. Y.

Application October 22, 1937, Serial No. 170,370

7 Claims. (Cl. 164—79)

This invention relates to shear guides for cutting cloth.

An object of this invention is to provide a shear guide of the character described which may be easily adjusted for cutting cloth at various angles.

A further object of this invention is to provide a shear guide of the character described, adapted to be mounted on a cutting table and which is adapted for use with tables of varying width, and being provided with saw blade or rubber grip for holding down the layers of cloth already cut.

Yet another object of this invention is to provide a strong and durable guide of the character described which shall be relatively inexpensive to manufacture, easy to adjust and manipulate, and which shall yet be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention:

Fig. 1 is a top plan view of a cutting table on which is mounted a shear guide embodying the invention;

Fig. 2 is an elevational, end view of the table and guide;

Fig. 3 is an enlarged, cross-sectional view taken on line 3—3 of Fig. 1 with the end clamp omitted;

Fig. 4 is an enlarged, cross-sectional view similar to Fig. 3, but showing an end clamp, and with the cloth piled up;

Fig. 5 is a cross-sectional view taken on line 5—5 of Fig. 4;

Fig. 6 is a partial, perspective view of a portion of the shear guide;

Fig. 7 is a view similar to Fig. 1, but showing the shear guides arranged for angular cutting of the cloth; and Fig. 8 is a partial, elevational, cross-sectional view of the cloth grip, illustrating a modified form thereof.

Referring now in detail to the drawing, 10 designates a portion of a usual cutting table on which cloth is laid in layers and cut to pattern. Numeral 11 designates a shear guide embodying the invention mounted on the cutting table 10.

Said shear guide 11 comprises generally of a pair of similar, symmetrically disposed clamps 12 at the opposite side edges of the table, each having a vertical opening 13, a grooved cross bar 14 disposed transversally of the table, and a pair of guide members 15 receiving said cross bar and provided with depending pins 16 passing through said vertical openings.

The clamps 12 each comprise a portion 20 contacting an edge 21 of the table. Extending from each end of said portion 20 are parallel outwardly inclined fingers 22, 23 disposed above and below the table 10. The top fingers 22 contact the top surface of the table. The bottom fingers 23 are formed with vertical screw-threaded openings in which are screwed vertical clamp screws 25 adapted to engage the under side of the table, for clamping the clamp 12 to the table. Extending substantially from the middle of portion 20 of each clamp is a lug or ear 26 formed with said vertical opening 13.

The cross bar 14 has a horizontal wall 30 and a pair of upwardly extending parallel walls 31 and 32, forming therebetween a groove 33 to receive the ends of a shear blade when cutting cloth 34 overlying said bar. Extending downwardly from the forward end of horizontal wall 30 is a wall or flange 35. Attached to the inner surface of flange 35 is an elongated, flat, thin plate 36, formed at the bottom edge thereof with blunt saw teeth or serrations 37, projecting below the lower edge of said flange, and adapted to grip the top cut layer of cloth 38. The plate 36, terminates short of the ends of the bar 14.

Said bar 14 is preferably greater in length than the width of the table so as to project well beyond the side edges of the table, for the purpose hereinafter appearing.

The guide members 15 slidably receive the portions of the cross bar 14 which extend beyond the side edges of the table, and are located on opposite sides of grip plate 36. Each of said members has a horizontal portion 40 contacting the under side of wall 30 of the cross bar, a vertical wall 41 contacting the inner surface of flange 35, a wall 42 contacting the under edge of said flange, a vertical wall 43 contacting the outer surface of said flange, and a horizontal wall 44 contacting the upper side of said wall 30. The rear edge 45 of wall 44 contacts flange 32, as shown in Fig. 4 of the drawing.

Wall 43 of each guide 15 has a screw-threaded opening receiving a set-screw 47 for fixing the guide to the cross bar in adjusted position.

Wall 40 of each guide has a pair of parallel depending apertured ears 50 carrying a transverse pin 51. The pins 16 have flattened apertured portions 16a, at their upper ends, received between the ears 50, and receiving the pins 51.

As stated above, the hanging pins 16 are slidably received in openings 13 of clamps 12 to permit the cross bar to be lifted as the cut layers 38 pile up.

The method of using my improved shear guide will now be described. The guide is mounted on table 10, as shown in Fig. 1 of the drawing, with screws 25 and 47 tightened. The cloth 34 laid on the table 10 is passed over the guide and then cut with shears, the groove 33 serving as a guide during the cutting operation. After the cloth is cut, the bar 14 is lifted and the cut end of the cloth is flattened out beneath the gripper 36. The bar 14 is then dropped to permit the gripping plate to engage the cut layer 38. Each time a layer is cut, this lifting and lowering operation is repeated.

The sliding connection between the members 15 and bar 14 permit use of my shear guide with tables of various widths.

Furthermore, the shear guide may be used for cutting cloth obliquely, as illustrated in Fig. 7 of the drawing. To adjust the shear guide for oblique cutting, it is merely necessary to loosen screws 25 and 47 at one or both ends, and slidably move one or both clamps 12 along the edges of the table, to the desired positions. During such adjustment, one or both of members 15 will slide on cross bar 14, and pins 16 will turn within openings 13. The screws 25 and 47 may then be tightened.

The bar 14 is longer than the width of the table to permit the adjustment of the shear guide for cutting the cloth at an angle, and to provide the available length at the ends of the bar 14, necessary for the sliding movement of the guide members 15 on said bar.

In Fig. 8 there is shown a modified form of cloth grip, plate 36 being replaced by a channel shaped member 50a made of rubber or the like material and receiving the lower edge of wall 35. The bottom of member 50a frictionally contacts the cut layer of cloth to hold the same against shifting.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. A pair of clamps adapted to be fixed to the side edges of an elongated cutting table in various longitudinal positions one independently of the other, a pair of members on said clamps movable vertically with respect thereto, said pair of members being pivotable about their vertical axes, a pair of members carried by said vertically movable members, and an elongated bar adapted to traverse said table, the ends of said bar being slidably and non-rotatably connected to said last pair of members.

2. A pair of clamps adapted to be fixed to the side edges of an elongated cutting table in various longitudinal positions one independently of the other, a pair of members on said clamps movable vertically with respect thereto, said members being pivotable about their vertical axes, a pair of members carried by said vertically movable members, and an elongated bar adapted to traverse said table, the ends of said bar being slidably and non-rotatably connected to said last pair of members, said bar having a pair of spaced, upwardly extending parallel flanges forming a groove therebetween serving as a guide for shears, said bar having a downwardly extending flange, and a cloth grip on said flange, said cloth grip comprising a channel shaped member made of rubber and receiving the lower end of said last mentioned flange.

3. In combination with a table, a pair of members slidably engaging the side edges of said table, means for clamping said members to said table, said members being formed with vertical through openings, a pair of members having pins pivoted thereto about horizontal axes, said pins being rotatably and slidably disposed within said openings, and an elongated grooved member traversing said table and slidably and non-rotatably connected to said last mentioned pair of members.

4. In combination with a table, a pair of members slidably engaging the side edges of said table, means for clamping said members to said table, said members being formed with vertical through openings, a pair of members having pins pivoted thereto about horizontal axes and rotatably and slidably disposed within said openings, an elongated grooved member traversing said table and slidably connected to said last mentioned pair of members, a cloth grip on said elongated member, and means for clamping said elongated member to said last mentioned pair of members in various longitudinal positions of said pair of members relative to said elongated member.

5. In combination with an elongated cutting table, a pair of clamps at the side edges of said table, an elongated bar formed with a longitudinal groove above said table and crossing said table, cooperating means between said clamps and bar to guide said bar during lifting movement of said bar, to permit said bar to drop freely by gravity toward the table, to connect said bar to said clamps for sliding as well as pivotal movement, means to fix said bar against sliding movement relative to said clamps in various adjusted positions, and an elongated cloth gripping means on said bar.

6. In combination, a pair of clamps adapted to be attached to the side edges of a table, a pair of parallel members slidably mounted on said clamps and adapted to extend perpendicularly above the table, grooved members at the upper ends of said parallel members, an elongated bar formed with a longitudinal groove and adapted to be disposed above and across said table, and slidably engaging within said grooved members.

7. In combination, a pair of clamps adapted to slidably engage the side edges of a table, means for individually fixing each of said clamps to said table in various adjusted longitudinal positions, a pair of parallel members mounted on said clamps for longitudinal sliding movement perpendicularly of said table, an elongated crossbar traversing said table and disposed above said table and formed with a longitudinal groove serving as a guide for shears, said cross-bar being connected to said parallel members for sliding movement perpendicularly of said members and for rotation about the longitudinal axes of said members, and said cross-bar being connected to said members non-slidably of the axes of said members.

MAXIMILIAN BRETH.